US011214381B2

(12) United States Patent
Jones et al.

(10) Patent No.: US 11,214,381 B2
(45) Date of Patent: Jan. 4, 2022

(54) AIRCRAFT HEATING ASSEMBLY WITH LIQUID COOLED INTERNAL COMBUSTION ENGINE AND HEATING ELEMENT USING WASTE HEAT

(71) Applicant: PRATT & WHITNEY CANADA CORP., Longueuil (CA)

(72) Inventors: Anthony Jones, San Diego, CA (US); Andre Julien, Ste-Julie (CA); David Menheere, Norval (CA); Jean Thomassin, Ste-Julie (CA); Richard Ullyott, St-Bruno (CA); Daniel Van Den Hende, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 952 days.

(21) Appl. No.: 15/227,501

(22) Filed: Aug. 3, 2016

(65) Prior Publication Data

US 2017/0036775 A1 Feb. 9, 2017

Related U.S. Application Data

(60) Provisional application No. 62/202,287, filed on Aug. 7, 2015.

(51) Int. Cl.

| *B64D 33/10* | (2006.01) |
| *B64D 41/00* | (2006.01) |
| *B64D 33/08* | (2006.01) |
| *B64F 5/20* | (2017.01) |
| *B64D 15/06* | (2006.01) |

(Continued)

(52) U.S. Cl.
CPC ............ *B64D 33/10* (2013.01); *B64D 15/06* (2013.01); *B64D 33/08* (2013.01); *B64D 41/00* (2013.01);

(Continued)

(58) Field of Classification Search
CPC .................... B64D 33/08; B64D 33/10; B64D 2033/0213; B64D 2033/0233;

(Continued)

(56) References Cited

U.S. PATENT DOCUMENTS

| 2,435,990 A * | 2/1948 | Weiler .................... F02C 7/047 60/267 |
| 3,948,053 A | 4/1976 | Gamell |

(Continued)

FOREIGN PATENT DOCUMENTS

| CA | 1300104 | 5/1992 |
| EP | 2006493 | 12/2008 |

*Primary Examiner* — Jesse S Bogue
*Assistant Examiner* — Loren C Edwards
(74) *Attorney, Agent, or Firm* — Norton Rose Fulbright Canada LLP (57) ABSTRACT

An aircraft heating assembly including an internal combustion engine having a liquid coolant system distinct from any fuel and lubricating system of the engine and including cooling passages in the internal combustion engine for circulating a liquid coolant from a coolant inlet to a coolant outlet, a coolant circulation path outside of the internal combustion engine and in fluid communication with the coolant inlet and the coolant outlet, and a heating element in heat exchange relationship with a portion of the aircraft to be heated. The coolant circulation path extends through a heat exchanger configured to remove a portion of a waste heat from the liquid coolant. The heating element is in heat exchange relationship with the coolant circulation path to receive another portion of the waste heat therefrom. A method of heating a portion of an aircraft is also discussed.

16 Claims, 5 Drawing Sheets

(51) Int. Cl.
   *F01P 3/20* (2006.01)
   *F01P 7/16* (2006.01)
   *B64D 33/02* (2006.01)

(52) U.S. Cl.
   CPC ............... *B64F 5/20* (2017.01); *F01P 3/20* (2013.01); *F01P 7/16* (2013.01); *B64D 2033/0213* (2013.01); *B64D 2033/0233* (2013.01); *F01P 2025/08* (2013.01); *F01P 2050/20* (2013.01); *F01P 2060/18* (2013.01); *F05D 2220/50* (2013.01); *F05D 2260/213* (2013.01); *Y02P 70/50* (2015.11); *Y02T 50/60* (2013.01)

(58) Field of Classification Search
   CPC ............ B64D 15/06; B64D 41/00; B64D 2013/0611; B64D 13/08; Y02T 50/675; B64F 5/20; F05D 2220/50; F05D 2260/213; F01P 3/02; F01P 3/20; F01P 7/16; F01P 7/165; F01P 2025/08; F01P 2050/20; F01P 2060/18; Y02P 70/585; F02C 7/14; F02C 7/224; F01K 23/065
   USPC .......................................................... 60/782
   See application file for complete search history.

(56) References Cited

U.S. PATENT DOCUMENTS

| | | | |
|---|---|---|---|
| 4,328,666 A | 5/1982 | Cummins | |
| 4,342,200 A | 8/1982 | Lowi, Jr. | |
| 4,815,282 A * | 3/1989 | Wilkinson | F02K 5/02 60/247 |
| 5,383,803 A * | 1/1995 | Pilgrim | F01P 3/202 440/88 HE |
| 5,579,728 A * | 12/1996 | Gotmalm | F01P 3/20 123/41.01 |
| 6,145,497 A | 11/2000 | Kervagoret et al. | |
| 6,536,382 B1 | 3/2003 | Wilksch | |
| 7,762,054 B2 | 7/2010 | Erickson et al. | |
| 8,365,526 B2 | 2/2013 | Stiermann | |
| 8,702,039 B1 * | 4/2014 | Epstein | B64D 15/02 244/134 B |
| 2002/0162318 A1 | 11/2002 | Kight | |
| 2003/0070849 A1 | 4/2003 | Whittaker | |
| 2008/0314573 A1* | 12/2008 | Schwarz | F01D 15/10 165/166 |
| 2010/0212857 A1* | 8/2010 | Bulin | F02C 7/14 165/41 |
| 2010/0269800 A1* | 10/2010 | Greszler | F02M 26/28 123/568.12 |
| 2013/0025566 A1* | 1/2013 | Thomassin | F01C 1/22 123/202 |
| 2013/0228647 A1 | 9/2013 | Bystry, Jr. et al. | |
| 2013/0283816 A1 | 10/2013 | Smith et al. | |
| 2013/0340459 A1 | 12/2013 | Pomme | |
| 2014/0102113 A1 | 4/2014 | Cuevas et al. | |
| 2017/0036775 A1 | 2/2017 | Jones et al. | |
| 2017/0152766 A1 | 6/2017 | Andersson et al. | |
| 2017/0210477 A1 | 7/2017 | Mackin et al. | |

* cited by examiner

AIRCRAFT HEATING ASSEMBLY WITH LIQUID COOLED INTERNAL COMBUSTION ENGINE AND HEATING ELEMENT USING WASTE HEAT

CROSS-REFERENCE TO RELATED APPLICATIONS

This application claims priority from provisional U.S. application No. 62/202,287 filed Aug. 7, 2015, the entire contents of which are incorporated by reference herein.

TECHNICAL FIELD

The application relates generally to liquid cooled internal combustion engines and, more particularly, to the use of waste heat from engine assemblies including such engines.

BACKGROUND OF THE ART

A known way to avoid or minimize icing problems in APU inlets includes designing the APU turbo-machinery to be capable of ingesting the ice without damage. However, such design may not be possible in all types of APU engines.

De-icing in other surfaces of the engine and the aircraft, pre-heating of oil and fuel, and generation of heat for cabin use is often provided by electrical elements using main aircraft power or power generated by the APU. The power required by such systems reduces the power available for other uses and/or increases the required size of the APU, and accordingly its weight and cost.

SUMMARY

In one aspect, there is provided an aircraft heating assembly comprising: an internal combustion engine having a liquid coolant system distinct from any fuel and lubricating system of the engine, the liquid cooling system including cooling passages in the internal combustion engine for circulating a liquid coolant from a coolant inlet to a coolant outlet; a coolant circulation path outside of the internal combustion engine, the coolant circulation path in fluid communication with the coolant inlet and the coolant outlet, the coolant circulation path extending through a heat exchanger configured to remove a portion of a waste heat from the liquid coolant; and a heating element in heat exchange relationship with the coolant circulation path to receive another portion of the waste heat therefrom, the heating element in heat exchange relationship with a portion of the aircraft to be heated.

In another aspect, there is provided a method of heating a portion of an aircraft, the method comprising: removing waste heat from an internal combustion engine of an auxiliary power unit of the aircraft with a dedicated liquid coolant distinct from any fuel and lubricating system of the auxiliary power unit; transferring at least part of the waste heat from the liquid coolant circulated out of the internal combustion engine to a heating element in heat exchange relationship with the portion of the aircraft; and heating the portion of the aircraft with the heating element.

DESCRIPTION OF THE DRAWINGS

Reference is now made to the accompanying figures in which.

DETAILED DESCRIPTION

Figure 1:
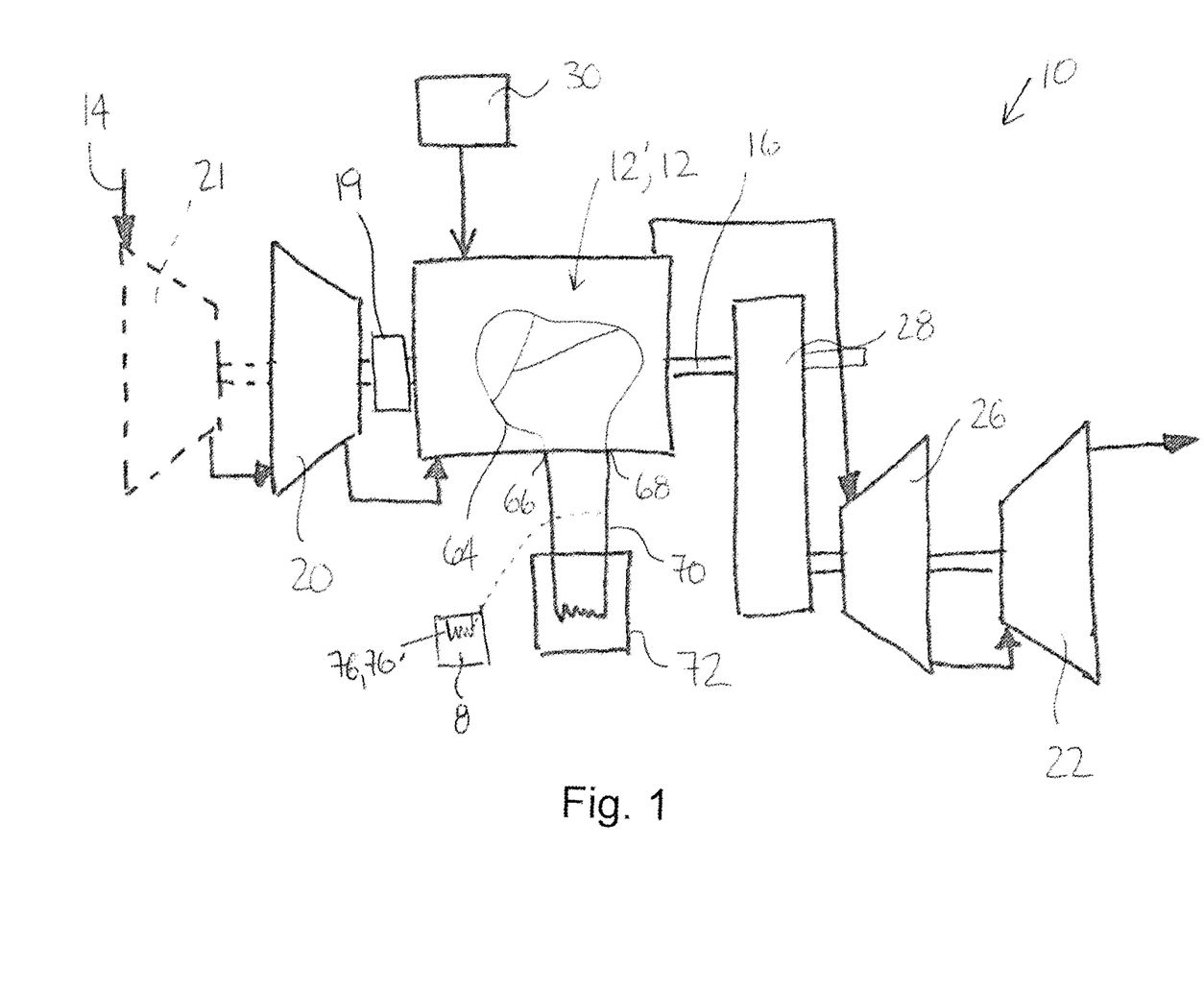
FIG. 1 is a diagram of an engine assembly in accordance with a particular embodiment.

Referring to FIG. 1, a compound engine assembly 10 which in a particular embodiment is used as an auxiliary power unit (APU) is generally shown. The compound engine assembly 10 generally includes a supercharger compressor 20 compressing the air to feed an engine core 12' including one or more intermittent internal combustion engines 12. The supercharger compressor 20 may also provide bleed air for the aircraft, or an additional compressor 21 may be provided for that use. The exhaust from the engine core 12' is fed to one or more turbines 26, 22 of a compounding turbine section. The compressor(s) 20, 21 may be driven by the turbines 26, 22 and/or the engine core 12'. In the embodiment shown, the compressor(s) 20, 21 is/are driven by the engine core 12' through a transmission 19; in another particular embodiment, the compressor(s) 20, 21 is/are driven by the turbines 26, 22, for example by being coupled to the same shaft or being engaged to the turbine shaft through a transmission. One or more of the turbines 26, 22 is/are configured to compound power with the engine core 12'; in the embodiment shown, the turbine and engine shafts are coupled through a transmission provided by a gearbox 28.

In a particular embodiment, the internal combustion engine(s) 12 are rotary intermittent internal combustion engine, for example Wankel engines; it is however understood that other types of liquid-cooled internal combustion engines, or other types of heat producing engines may alternately be used.

Figure 2:
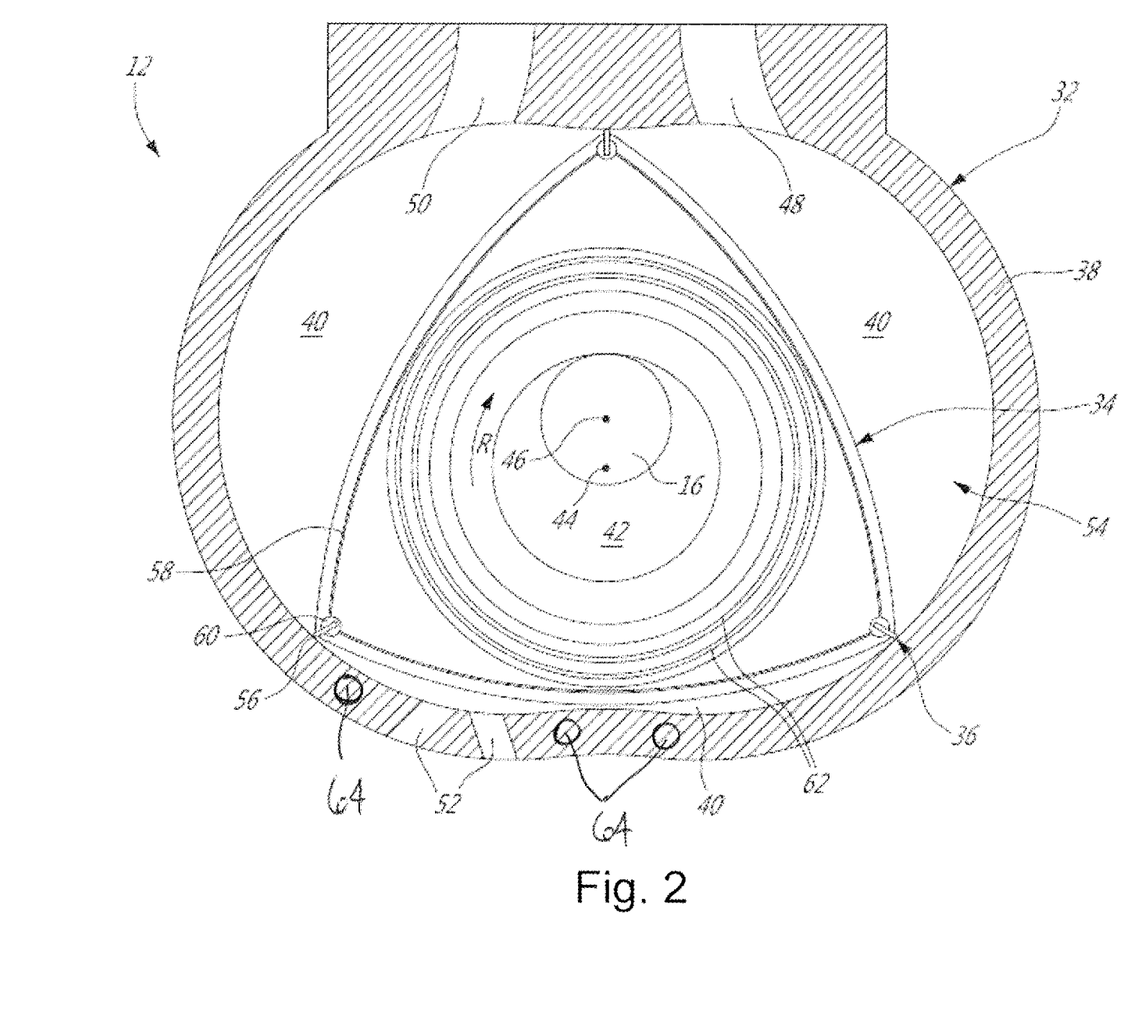
FIG. 2 is a schematic cross-sectional view of a rotary engine which can be used on the engine assembly of FIG. 1.

Referring to FIG. 2, an example of a Wankel engine which may be used in the engine core 12' is shown. It is understood that the configuration of the engine(s) 12, e.g. placement of ports, number and placement of seals, etc., may vary from that of the embodiment shown.

The engine 12 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of an output shaft 16 to perform orbital revolutions within the rotor cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug, glow plug or other ignition mechanism, as well as for one or more fuel injectors of a fuel injection system (not shown in FIG. 1) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 12, which in a particular embodiment are common rail fuel injectors, communicate with a source 30 (see FIG. 1) of Heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere.

Referring back to FIG. 1, the engine core 12' is liquid cooled. An aircraft heating assembly includes a coolant system for the engine(s) 12 of the engine core 12', which in a particular embodiment is distinct from any fuel and lubricating system of the engine(s) 12 and of the auxiliary power unit 10 as a whole. In other words, a dedicated coolant is circulated through the engine(s) 12 of the engine core 12', through a plurality of cooling passages 64 defined in the walls of the housing 32, and this dedicated coolant is circulated separately and independently from the lubricant and the fuel of the auxiliary power unit 10, including the lubricant of the engine core 12'. The dedicated liquid coolant may be for example water, or water mixed with anti-freeze liquid(s) such as ethylene glycol. The cooling passages 64 are in fluid communication with a coolant inlet 66 and a coolant outlet 68 of the engine core 12', whether directly or through communication with one or more other cooling passages 64. A coolant circulation path 70 is defined outside of the engine(s) 12, in fluid communication with the coolant inlet 66 and the coolant outlet 68. The coolant circulation path 70 extends through a heat exchanger 72 configured to remove waste heat from the coolant. The term "waste heat" as used herein refers to the heat from the heated coolant circulated out of the engine core 12', which needs to be removed before the coolant is recirculated to the engine core 12' to perform its cooling function, or to any other type of waste heat produced by the heat producing engine(s) of the engine core 12'. The coolant cooling system including the coolant circulation path 70 provides an opportunity to transfer heat to useful locations using the "used" coolant as a medium. The aircraft heating assembly accordingly includes one or more heating elements 76, 76' in heat exchange relationship with the coolant circulation path 70, and in heat exchange relationship with a portion 8 of the aircraft to be heated.

Figure 3:
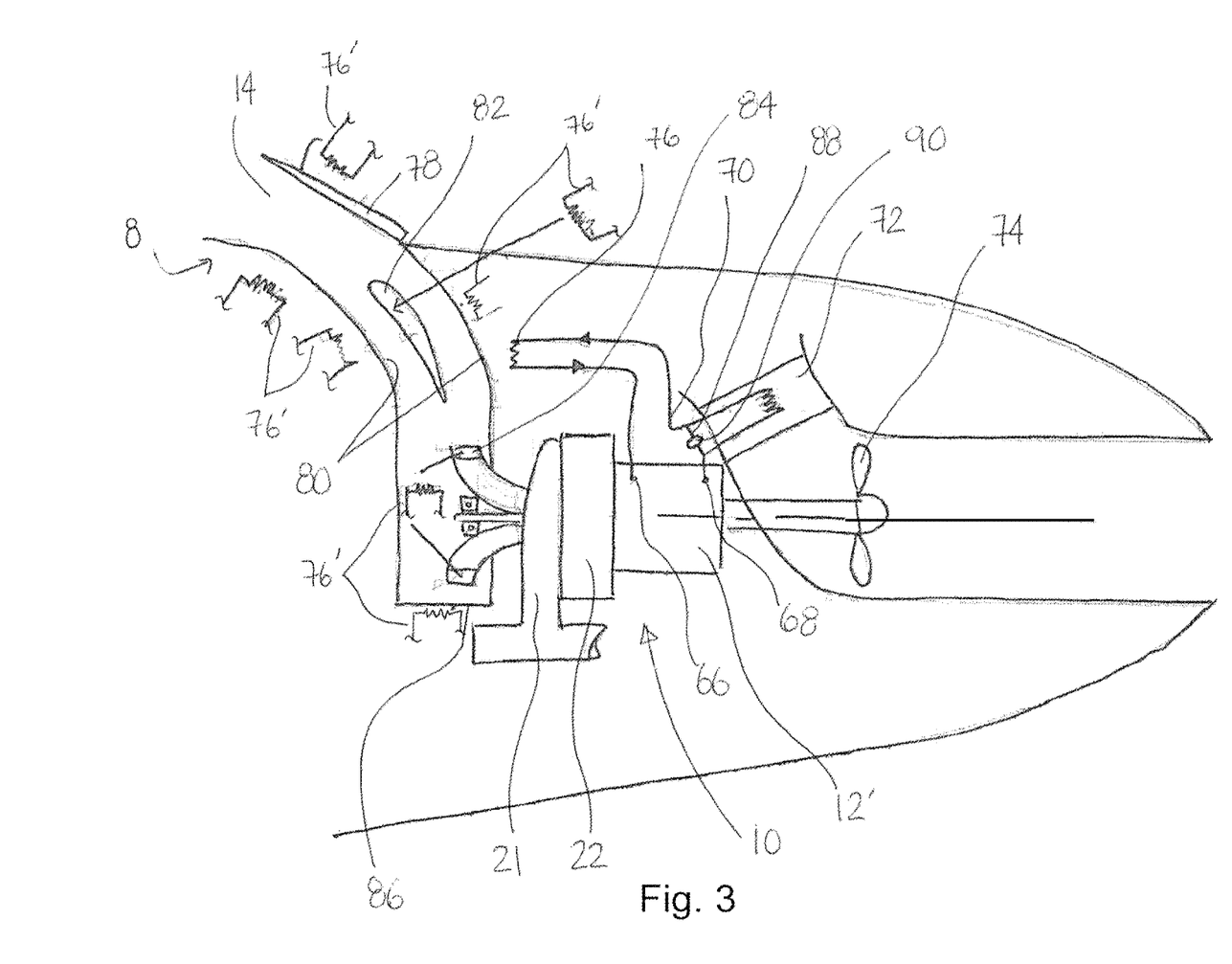
FIG. 3 is a schematic cross-sectional view of an engine assembly such as FIG. 1, used as an auxiliary power unit (APU) and including inlet heating elements, in accordance with a particular embodiment.

Referring to FIG. 3, a configuration for the engine assembly 10 and aircraft heating assembly according to a particular embodiment is shown, where the engine assembly 10 is an auxiliary power unit (APU) and the waste heat is used to prevent or limit ice formation in the inlet 14 of the engine assembly 10. In this embodiment, the heating elements 76 are in heat exchange relationship with the coolant circulation path 70 by being in fluid communication therewith, and the portion 8 of the aircraft to be heated includes multiple surfaces in the air inlet communicating with the compressor 20. The hot coolant from the engine(s) 12 is circulated directly through fluid passages forming the liquid heating elements 76, each positioned in heat exchange relationship with a relevant inlet surface to prevent or limit ice formation when the engine assembly 10 is running. After performing this heating function, the coolant is returned to the coolant circulation path 70 at reduced temperature. Although the fluid communication between only one of the heating elements 76 and the coolant circulation path 70 is illustrated, it is understood that any other heating element, such as in the exemplary heating element locations shown at 76', is also in fluid communication with the coolant circulation path 70. Exemplary locations for the heating elements 76, 76' and accordingly portion(s) 8 of the aircraft to be heated include, but are not limited to, the inlet door 78, the inlet duct surfaces 80, flow turning devices 82 (e.g. splitters, acoustic panels), compressor variable inlet guide vanes 84, and/or confined areas 86 existing within the inlet where the geometry may be conducive to ice accretion.

The engine core 12' is used to rotate a fan 74 driving a cooling airflow through the heat exchanger 72. Although not shown, a suitable flow driving element (e.g. pump) is provided in fluid communication with the coolant circulation path 70 to drive the circulation of the coolant therethrough and through the cooling passages 64. A bypass conduit 88 provides a fluid communication between a portion of the coolant circulation path 70 upstream of the heat exchanger 72 and a portion of the coolant circulation path 70 downstream of the heat exchanger 72. The bypass conduit 88 includes a valve 90 modulated by a thermostat, which accordingly regulates the temperature of the coolant by selectively bypassing the heat exchanger 72. In a particular embodiment, the bypass system is designed to fail safe such that the engine cooling circuit is not compromised by a failure of the bypass valve 90; this could include, for example, the capability to detect low heating system back pressure (indicating leakage) and closing off the system if it falls, and/or designing the bypass system to most probably fail in the non-bypassing mode (full flow to the heat exchanger 72).

Most APU installations are in the tail-plane area. In the embodiment shown in Referring to FIG. 4a, a configuration for the engine assembly 10 according to another particular embodiment is shown, where the engine assembly 10 is an auxiliary power unit (APU) and the waste heat is used to provide thermal anti-icing (or augment the capability of existing anti icing systems) in tail-plane aerodynamic surfaces 90. The heating elements 76 are thus defined by fluid passages under key tail-plane aerodynamic surfaces 90, through which the heated coolant from the coolant circulation path 70 is circulated. After performing its heating function the coolant is returned to the coolant circulation path 70 at reduced temperature. Although not shown in FIG.

Figure 4A:
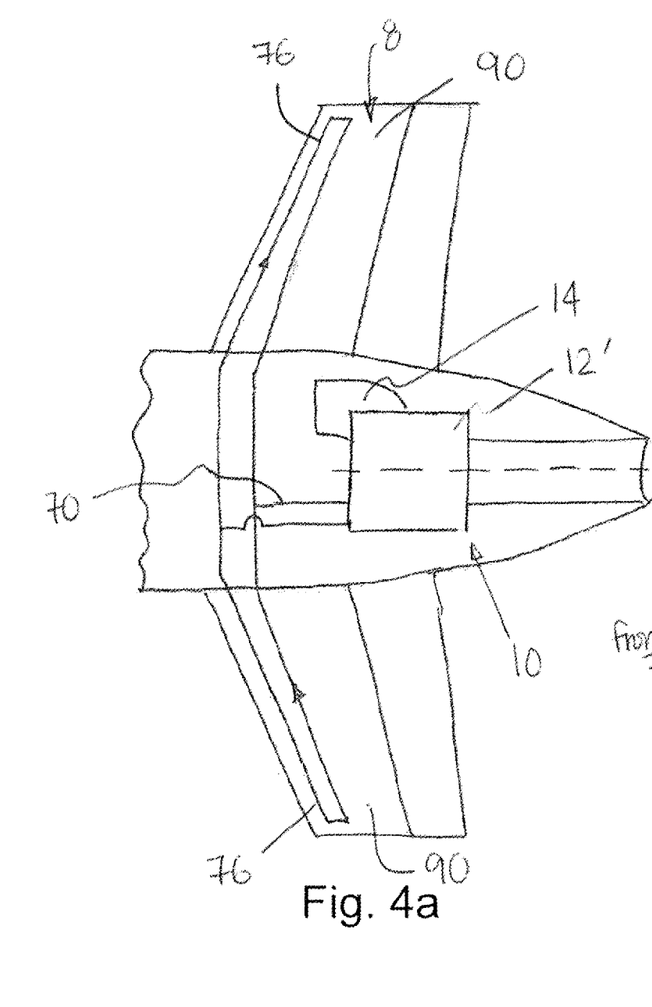
FIG. 4a is a schematic cross-sectional view of an engine assembly such as FIG. 1, used as an auxiliary power unit (APU) and including tailplane heating elements, in accordance with another particular embodiment.

4a, the coolant circulation path 70 extends through the heat exchanger 72 such as shown in FIG. 1.

Since the APU may be run on the ground, this embodiment may have the advantage of keeping part of the aircraft ice free in cold weather between flights. This may reduce or eliminate the need for fluid de-icing prior to departure.

It is understood that although the heating elements 76 are shown as extending in a horizontal tail-plane in close proximity to the APU, alternately the heating elements 76 could be placed under any aircraft surface requiring to be heated in cold weather, particularly while the APU is running.

Figure 4B:
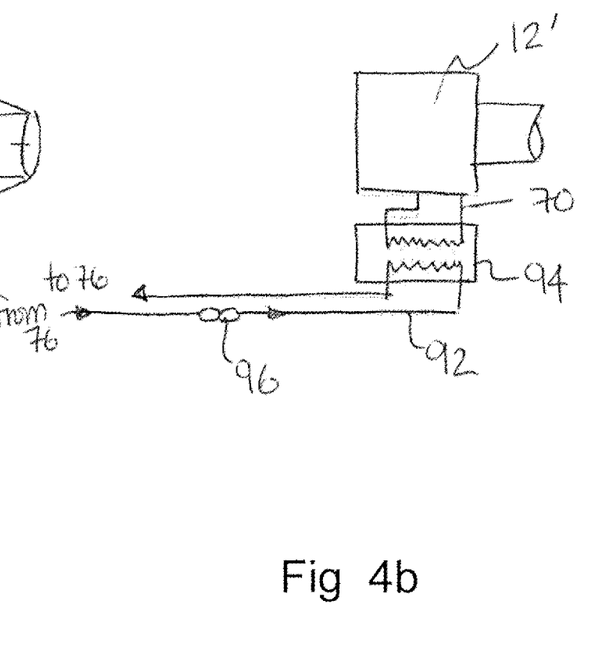
FIG. 4b is a schematic cross-sectional view of part of an engine assembly such as shown in FIG. 4a with a fluid circulation system in accordance with another particular embodiment.

FIG. 4b shows a variation of the embodiment of FIG. 4a, where the heating element 76 is in heat exchange relationship with the coolant circulation path 70 being in fluid communication with a fluid circulation path 92, defined separately from the coolant circulation path 70 and receiving waste heat from the coolant circulation path 70. The fluid (e.g. liquid) circulating through the fluid circulation path 92 and through the heating elements 76 may have the same or a different composition than the coolant circulating through the coolant circulation path 70, but both circulate independently, i.e. without being in fluid communication with one another. The fluid circulation path 92 and coolant circulation path 70 are in heat exchange relationship with one another through a heat exchanger 94 (e.g. liquid to liquid heat exchanger). In a particular embodiment, such a configuration allows for improved segregation between the two systems, so that a failure of the aerodynamic surface heating fluid circuit does not necessarily critically impair the function of the APU. A separate circulating pump system 96 is used for the fluid circulating through the fluid circulation path 92. Although not shown in FIG. 4b, the coolant circulation path 70 extends through the heat exchanger 72 such as shown in FIG. 1.

It is understood that the separate fluid circulation path 92 with heat exchanger 94 can also be used in an inlet de-icing system such as shown in FIG. 3 to circulate a separate fluid through the heating elements 76, 76'.

Figure 5:
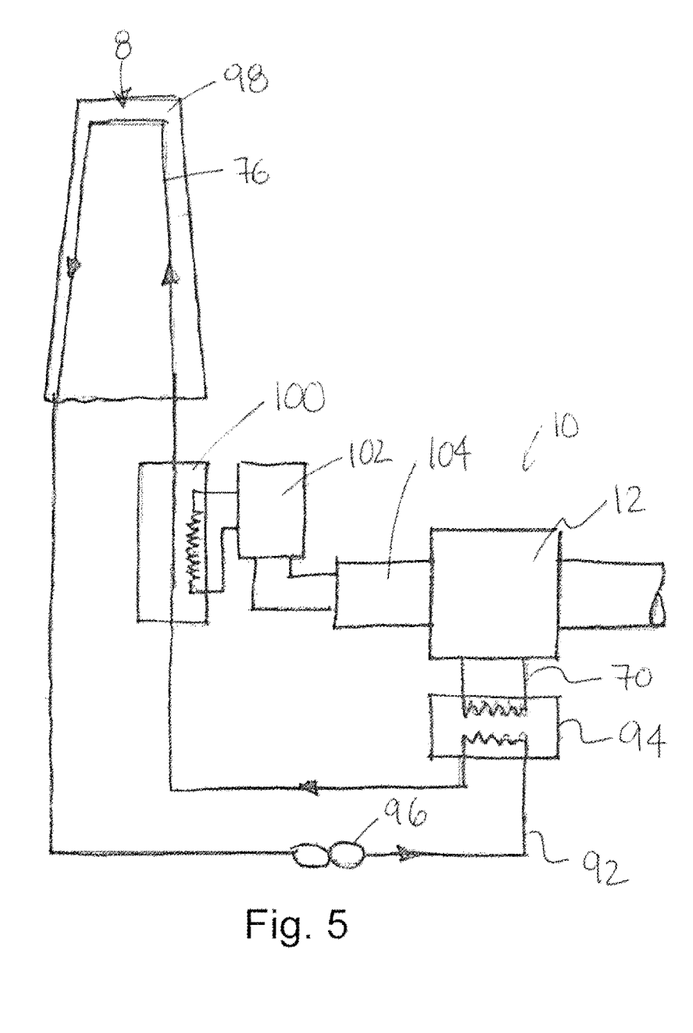
FIG. 5 is a schematic cross-sectional view of an engine assembly such as FIG. 1, used as an auxiliary power unit (APU) and including aircraft heating elements, in accordance with another particular embodiment.

In a larger aircraft the APU waste heat may be not be sufficient to provide adequate heat for de-icing. Referring to FIG. 5, a configuration for the engine assembly 10 and aircraft heating assembly according to another particular embodiment is shown, where the engine assembly 10 is an auxiliary power unit (APU) and the waste heat is used to provide thermal anti-icing in an aerodynamic surface 98 (in the tail or elsewhere). Here again, the heating element 76 is defined by a fluid passage under the aerodynamic surface 98. In the embodiment shown, the heating element 76 is in fluid communication with the fluid circulation path 92 defined separately from the coolant circulation path 70 and in heat exchange relationship therewith through the heat exchanger 94; it is understood that alternately, the heating element 76 may be in fluid communication with the coolant circulation path 70 so that the coolant from the engine core 12' is circulated directly therethrough.

In this embodiment, one or more electrical heating element(s) 100 is/are in heat exchange relationship with the heating element(s) 76. For example, the temperature of the fluid circulating through the heating element 76 is boosted by the electrical heating elements 100, operating from the power produced by a generator 104 driven by the engine core 12' (as shown) or from the aircraft power supply. These boost electrical heating elements 100 could be local to the anti-icing site. For example, the warm fluid (engine liquid coolant or separate fluid) is pumped to the wing leading edge area, where its temperature is locally boosted by the electrical heating elements 100 before entering the heating element(s) 76. Furthermore such a system could provide a measure of bi-energy capability and be operable using either the waste heat from the engine core 12', electrical power in combination with waste heat, or electrical power alone (with the aid of an auxiliary circulating pump when the liquid coolant of the engine core 12' is used). The heating element(s) 100 is/are controlled by a de-icing temperature controller 102 according to the requirements for de-icing and the waste heat temperature available from the engine core 12'. The return temperature to the engine core 12' may be controlled by modulating or cycling the electrical heating element 100 so that the thermal capacity of the coolant heat exchanger 72 (see FIG. 1) is not exceeded.

Although not shown, the temperature of the fluid circulating through the heating element 76 may be additionally or alternately boosted using the waste heat generated by the cooling and/or lubricating oil used to cool and/or lubricate other elements of the engine core 12' and/or of the engine assembly 10.

In a particular embodiment, the waste heat from the engine core 12' can thus be used, for example through circulating the coolant of the engine core 12' or a fluid in heat exchange therewith through heating elements 76, 76' at various locations, to provide heat for de-icing or icing prevention in a portion 8 of the aircraft including any one of or in any combination of: engine inlet (e.g. APU inlet), inlet door, inlet splitter, inlet plenum, variable inlet guide vanes, tailplane surfaces, airfoil surfaces (with or without assist from local electrical heating elements), etc., for example as set forth above.

In addition or in the alternative, the portion 8 of the aircraft to be heated can include engine oil and/or engine fuel: the heating elements 76, 76' can be used to provide engine oil warming and/or fuel heating for other engines in reasonable proximity to the engine assembly 10. For example, the waste heat from the APU may be used for engine oil pre-heating in extreme climates. Engine starting drag rises at very cold extreme temperatures due to high oil viscosity. The APU waste heat may be used to pre-warm the engine oil for the prime mover engine(s) or the nacelle. This may be more easily, although not exclusively, arranged for rear fuselage mounted engines where the nacelles would be in relatively close proximity to the APU. The APU waste heat may also or alternately be used for fuel pre-heating and/or fuel icing prevention. The portion 8 of the aircraft to be heated can include a ram air inlet, so as to provide ram air pre-heating.

In addition or in the alternative, the portion 8 of the aircraft to be heated can include air and/or water in a passenger cabin: the heating elements 76, 76' can be used as a source of heat for cabin use such as hot water (heating element in heat exchange relationship with water source), or cabin heating in cold weather ((heating element in heat exchange relationship with air source), for example using waste heat from the APU.

In addition or in the alternative, the portion 8 of the aircraft to be heated can include electronic or electrical equipment: the heating elements 76, 76' can be used as a source of heat for electronic or electrical equipment which must start rapidly in cold conditions, including batteries. Electronic equipment can suffer delayed start up in cold conditions. Electronic equipment in the vicinity of the APU can be heated by waste heat from the APU coolant cooling system. This can also be applied to electrical batteries, the performance of which may drop rapidly at low temperatures.

Accordingly, in a particular embodiment, the portion 8 of the aircraft (which may include portions of the auxiliary power unit 10) is heated in accordance with the following. Waste heat is removed from the internal combustion engine(s) 12 of the auxiliary power unit 10 with the dedicated liquid coolant distinct from any fuel and lubricating system of the auxiliary power unit 10. At least part of the waste heat is transferred from the liquid coolant circulated out of the engine(s) 12 to the heating element(s) 76, 76' in heat exchange relationship with the portion 8 of the aircraft, and the portion 8 of the aircraft with is heated the heating element(s) 76, 76'.

As detailed above, transferring the waste heat to the heating element 76, 76' may include circulating the liquid coolant through the heating element 76, 76' or circulating an additional fluid in heat exchange relationship with the liquid coolant to transfer the waste heat to the additional fluid, and circulating the additional fluid through the heating element 76, 76'. Also, in a particular embodiment, only part of the waste heat is transferred from the liquid coolant to the heating element 76, 76', and a remaining part of the waste heat is removed from the liquid coolant through heat exchange with a cooling air flow. The portion of the liquid coolant circulated in heat exchange relationship with the cooling air flow may be modulated. The heating element(s) 76, 76' may be heated by an additional heat source separate from the waste heat of the liquid coolant (for example electrical heating elements 100 and/or waste heat from other systems, e.g. lubrication system).

As detailed above, the portion 8 of the aircraft heated with the heating element(s) 76, 76' may be any one or any combination of a surface susceptible to icing, one or more element(s) of the air inlet communicating with the internal combustion engine(s) 12 (e.g. inlet door, inlet duct surface, flow splitter, acoustic panel, inlet plenum, variable inlet guide vanes), a tailplane surface, an airfoil surface, engine oil, engine fuel, the main engine ram air inlet, air in the passenger cabin, water in the passenger cabin, and electronic or electrical equipment (e.g. battery).

Although the engine assembly 10 is shown as a turbo compound engine assembly 10, it is understood that it could alternately be a non-supercharged engine assembly and/or an engine assembly with an engine core including one or more liquid cooled reciprocating engine(s) with similar heat balance. For example, the heating element(s) 76, 76' can be used to recycle waste heat of a liquid cooled engine used without a compressor and/or without turbines.

In a particular embodiment, the engine assembly 10 with an internal combustion engine core 12' (e.g. rotary engine core), with its constant volume combustion cycle, has a waste heat breakdown different from a pure gas turbine engine. Less heat is evacuated through the exhaust and more heat is given up to the engine casing resulting in a need for a core engine cooling system. With a liquid cooling mechanism being employed there is also opportunity to transport significant amounts of waste heat to areas of the aircraft where it may be useful with low pumping energy cost. In this way the need for cooling provisions on the engine (e.g. APU) installation itself can be reduced and the demand on expensive sources of energy such as main engine bleed and main electrical power can be reduced.

It is understood that the engine core 12' can alternately include any other similar engine with a closed combustion volume resulting in a similar heat balance, including, but not limited to, reciprocating engine(s).

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An aircraft heating assembly comprising:
   an internal combustion engine having a liquid coolant system distinct from both of a fuel system and a lubricating system of the internal combustion engine, the liquid cooling system including a plurality of cooling passages in the internal combustion engine for circulating a liquid coolant from a coolant inlet to a coolant outlet;
   a coolant circulation path outside of the internal combustion engine, the coolant circulation path in fluid communication with the coolant inlet and the coolant outlet, the coolant circulation path extending through a heat exchanger configured to remove a portion of a waste heat from the liquid coolant, the coolant circulation path distinct from the fuel system and distinct from the lubrication system of the engine;
   a fluid circulation path having a portion running along an underside of a surface of an aircraft to be heated, the surface including a tailplane surface of the aircraft, the portion of the fluid circulation path in direct heat exchange relationship with the underside of the surface at locations of the surface susceptible to icing, the fluid circulation path in heat exchange relationship with the coolant circulation path to receive another portion of the waste heat therefrom, the fluid circulation path distinct from both the fuel system and the lubrication system.

2. The assembly as defined in claim 1, wherein the fluid circulation path is fluidly connected to the coolant circulation path, a fluid flowing in to the fluid circulation path being the liquid coolant.

3. The assembly as defined in claim 1, wherein the coolant circulation path is in heat exchange relationship with the fluid circulation path through an additional heat exchanger.

4. The assembly as defined in claim 1, further comprising a bypass conduit providing fluid communication between a first portion of the coolant circulation path upstream of the heat exchanger and a second portion of the coolant circulation path downstream of the heat exchanger, the bypass conduit including a valve modulated by a thermostat.

5. The assembly as defined in claim 1, further comprising an electrical heating element in heat exchange relationship with the fluid circulation path.

6. The assembly as defined in claim 1, further comprising at least one heating element in fluid communication with the fluid circulation path.

7. The assembly as defined in claim 1, wherein the surface of the aircraft to be heated further includes at least a portion of at least one air inlet element of an air inlet communicating with the internal combustion engine.

8. The assembly as defined in claim 7, wherein the at least one air inlet element is selected from the group consisting of: inlet door, inlet duct surface, flow splitter, acoustic panel, inlet plenum, and variable inlet guide vanes.

9. The assembly as defined in claim 1, wherein the surface of the aircraft to be heated further includes an airfoil surface.

10. The assembly as defined in claim 1, wherein the coolant circulation path is further in heat exchange relationship with one or both of engine oil and engine fuel of a main engine of the aircraft.

11. The assembly as defined in claim 1, wherein the surface of the aircraft to be heated further includes a ram air inlet for a main engine of the aircraft.

12. The assembly as defined in claim 1, wherein the coolant circulation path is further in heat exchange relationship with one or both of air and water in a passenger cabin of the aircraft.

13. The assembly as defined in claim 1, wherein the coolant circulation path is further in heat exchange relationship with electronic or electrical equipment.

14. The assembly as defined in claim 1, wherein the internal combustion engine is a Wankel rotary engine including a rotor having three apex portions mounted for eccentric revolutions within an internal cavity defined in a housing, the internal cavity having an epitrochoid shape with two lobes, the cooling passages being defined through the housing.

15. The assembly as defined in claim 1, further comprising a compressor in fluid communication with an air inlet of the internal combustion engine, and a turbine in fluid communication with an exhaust of the internal combustion engine, the turbine compounded with the internal combustion engine.

16. An aircraft heating assembly comprising:
an internal combustion engine having a liquid coolant system distinct from both of a fuel system and a lubricating system of the internal combustion engine, the liquid cooling system including cooling passages in the internal combustion engine for circulating a liquid coolant from a coolant inlet to a coolant outlet, the internal combustion engine in driving engagement with a rotatable load;
a coolant circulation path outside of the internal combustion engine, the coolant circulation path in fluid communication with the coolant inlet and the coolant outlet, the coolant circulation path extending through a heat exchanger configured to remove a portion of a waste heat from the liquid coolant;
a fluid circulation path having a portion running along an underside of a surface of an aircraft to be heated, the portion of the fluid circulation path in direct heat exchange relationship with the underside of the surface at locations of the surface susceptible to icing, the fluid circulation path in heat exchange relationship with the coolant circulation path to receive another portion of the waste heat therefrom; and
a turbine in fluid communication with an exhaust of the internal combustion engine, the turbine in driving engagement with the rotatable load to compound power with the internal combustion engine in driving the rotatable load.

* * * * *